United States Patent
Perfitt

(10) Patent No.: US 10,785,647 B1
(45) Date of Patent: Sep. 22, 2020

(54) TRUSTED BEACON BASED LOCATION DETERMINATION SYSTEM AND METHOD

(71) Applicant: Proxidyne, Inc., Naperville, IL (US)

(72) Inventor: Timothy James Perfitt, Naperville, IL (US)

(73) Assignee: Proxidyne, Inc., Naperville, IL (US)

( * ) Notice: Subject to any disclaimer, the term of this patent is extended or adjusted under 35 U.S.C. 154(b) by 106 days.

(21) Appl. No.: 16/207,720

(22) Filed: Dec. 3, 2018

Related U.S. Application Data

(62) Division of application No. 15/075,144, filed on Mar. 19, 2016, now Pat. No. 10,149,159.

(60) Provisional application No. 62/135,638, filed on Mar. 19, 2015.

(51) Int. Cl.
| | |
|---|---|
| *H04L 29/06* | (2006.01) |
| *H04W 12/06* | (2009.01) |
| *H04W 12/04* | (2009.01) |
| *H04L 9/32* | (2006.01) |
| *H04L 29/08* | (2006.01) |
| *H04W 4/80* | (2018.01) |

(52) U.S. Cl.
CPC ............ *H04W 12/06* (2013.01); *H04L 9/3236* (2013.01); *H04L 9/3247* (2013.01); *H04L 9/3268* (2013.01); *H04L 67/10* (2013.01); *H04W 12/04* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 2002/0116610 A1* | 8/2002 | Holmes | ............... | H04L 9/3263 713/156 |
| 2009/0037526 A1* | 2/2009 | Elliott | ................ | A63F 13/358 709/203 |
| 2009/0262663 A1* | 10/2009 | Gosset | ............... | H04W 8/005 370/254 |
| 2012/0159584 A1* | 6/2012 | Pizot | ................. | G06F 21/608 726/5 |
| 2013/0279381 A1* | 10/2013 | Sampath | ............ | H04W 56/00 370/311 |
| 2014/0222685 A1* | 8/2014 | Middleton | .......... | H04W 12/04 705/50 |
| 2014/0351912 A1* | 11/2014 | Fu | ..................... | H04L 63/0876 726/7 |
| 2017/0195874 A1* | 7/2017 | DeLeeuw | ............ | H04W 12/04 |

* cited by examiner

*Primary Examiner* — Malcolm Cribbs
(74) *Attorney, Agent, or Firm* — Erickson Law Group, PC

(57) ABSTRACT

Trusted beacon based location determination system and method is disclosed. An electronic beacon broadcasts a cryptographically signed beacon identifier to listening devices. Listening devices are configured to verify the integrity of the cryptographically signed beacon identifier by using the beacon's public key. Listening devices may also be configured to verify the validity of the public key by verifying a digital certificate corresponding to the beacon. Listening devices may be configured with location-based functionality that determines a relative location of the listening device if the cryptographically signed beacon identifier is verified.

23 Claims, 11 Drawing Sheets

| UUID | Location |
|---|---|
| 12D3C20E-1BBE-493F-B36D-7E72FDE98618 | Checkout Area, ACME Co., Chicago, IL |
| 12D3C20E-1BBE-493F-B36D-7E72FDE98619 | Electronics Dept., ACME Co., Chicago, IL |
| 12D3C20E-1BBE-493F-B36D-7E72FDE98620 | Service Dept., ACME Co., Chicago, IL |
| 12D3C20E-1BBE-493F-B36D-7E72FDE98622 | Apparel Dept., ACME Co., Chicago, IL |

Fig. 2A

| Location | Chicago | New York | Portland |
|---|---|---|---|
| UUID | 12d3c20e1bbe493fb36d7e72fde98618 | 12d3c20e1bbe493fb36d7e72fde98618 | 12d3c20e1bbe493fb36d7e72fde98618 |
| Major | 1 | 2 | 3 |
| Minor (Checkout Area) | 10 | 10 | 10 |
| Minor (Electronics Dept) | 20 | 20 | 20 |
| Minor (Service Dept) | 30 | 30 | 30 |

Fig. 2B

| Item | Example Value |
|---|---|
| UUID | 12d3c20e1bbe493fb36d7e72fde98618 |
| Major | 000a |
| Minor | 0064 |
| Sig. Number | d6badcb31975 |
| Message | 12d3c20e1bbe493fb36d7e72fde98618000a0064d6badcb31975 |
| Hash Digest | 878cdee8d247fccff2905a0142b485eb277419ed |
| Beacon ID Signature | 5e0f11074dccdaa93a4cfcee669afb6836fdb6e7113ae030f797a8d6f92f3eb55fdcbd46b86acaa8 |
| Public Key | ccc55da74887fd66a36fda0561d9c9798924f1d4eac1fb4442a33e0f4940a5deb6c02a491327a24e |
| Private Key | 7f6955e3c884e40e72e9542e3117becbace53412 |
| Signature Payload | 5e0f11074dccdaa93a4cfcee669afb6836fdb6e7113ae030f797a8d6f92f3eb55fdcbd46b86acaa80d6badcb31975 |

Fig. 5

| Field | Value |
| --- | --- |
| Version number | 3 |
| Serial number | 34857627101 59627900 |
| Certificate Signature Algorithm ID | SHA-1 with RSA Encryption |
| Issuer name | Acme Trusted Beacon Authority [TBA] |
| Not Valid Before | 10/7/2015 at 10:31:49 PM CDT |
| Not Valid After | 10/6/2016 at 10:31:49 PM CDT |
| Subject name | 12d3c20e1bbe493fb36d7e72fd e98618000a0064 [Beacon Identifier] |
| Subject's public key Algorithm | ECC Encryption |
| Subject's public key | Ccc55da74887fd66a36fda0561 d9c9798924f1d4eac1fb4442a3 3e0f4940a5deb6c02a491327a2 4e [Beacon's Public Key] |
| Extensions | |
| Certificate signature | 44dddebe... |

Fig. 6

TRUSTED BEACON BASED LOCATION DETERMINATION SYSTEM AND METHOD

This application is a divisional application of U.S. patent application Ser. No. 15/075,144, filed on Mar. 19, 2016, which is herein incorporated by reference in its entirety, and which claims the benefit of U.S. Provisional Patent Application No. 62/135,638, filed on Mar. 19, 2015.

FIELD OF THE INVENTION

This invention relates in general to electronic beacons.

BACKGROUND OF THE INVENTION

When an electronic beacon transmits advertising packets to a nearby listening device without requiring the listening device to establish an authenticated connection to the electronic beacon, the criteria for accepting the validity of the advertising packet has been based on the contents of the advertising packet. When the advertising packets are not encrypted, any device can listen for and read the advertising packet and then re-create the advertising packet in the same or different location as the location of the originally transmitting electronic beacon. The re-creation or copying of the advertising packets is referred to as spoofing.

The present inventor recognized that the risk of spoofing limits the use of electronic beacons to cases where spoofing is not a concern. The present inventor recognized that in many cases authentication to a transmitting electronic beacon adds additional steps, takes additional time, increases expense, and/or is otherwise inconvenient. The present inventor recognized that it would be desirable for a receiving device to validate content of data transmitted from an electronic beacon without the need to authenticate to the transmitting electronic beacon. The present inventor recognized a need for a system and method that eliminates spoofing risks associated with electronic beacons. The present inventor recognized the need for a system and method that provides a more secure means of determining the location of a listening device based on data received from a transmitting electronic beacon.

SUMMARY OF THE INVENTION

Trusted beacon based location determination system and method is disclosed. In some embodiments, an electronic beacon is configured to broadcasts a cryptographically signed beacon identifier to listening devices. Listening devices are configured to verify the integrity of the cryptographically signed beacon identifier by using the electronic beacon's public key. Listening devices may also be configured to verify the validity of the public key by verifying a validity of a digital certificate corresponding to the beacon. Listening devices may comprise location-based functionality that determines a relative location of the listening device or carries out other functionality if the cryptographically signed beacon identifier is verified.

In some embodiments, the trusted beacon system comprises a beacon, a client device, and a trusted beacon authority. In some embodiments, the client device comprises a processor, a memory, and a transceiver. The client device may comprise a listening function, a receiving function, a decrypting function, a generating function, a verifying function, and a match determining function, and a location determining function.

The listening function detects wireless advertising packets of the electronic beacon. The receiving function receives one or more advertising packets comprising a beacon identifier signature and a beacon identifier. The decrypting function decrypts the beacon identifier signature using a public key associated with the beacon identifier to result in a decrypted output. The generating function generates a check hash digest by applying a cryptographic hash algorithm to the beacon identifier. The verifying function verifies a validity of a digital certificate corresponding to the beacon identifier. The digital certificate comprises the public key and the beacon identifier. The match determining function determines whether the check hash digest matches the decrypted output. The location determining function determines the location of the client electronic device using the received beacon identifier in response to the check hash digest matching the decrypted output and the digital certificate being verified as valid.

Numerous other advantages and features of the present invention will become readily apparent from the following detailed description of the invention and the embodiments thereof, from the claims, and from the accompanying drawings.

BRIEF DESCRIPTION OF THE DRAWINGS

FIG. 2A is an exemplary location lookup table.

FIG. 2B is a second exemplary location lookup table.

FIG. 5 is a table providing exemplary data for a beacon identifier signature function of the trusted beacon system.

FIG. 6 is a table representation of an exemplary beacon digital certificate.

DETAILED DESCRIPTION

Figure 1:
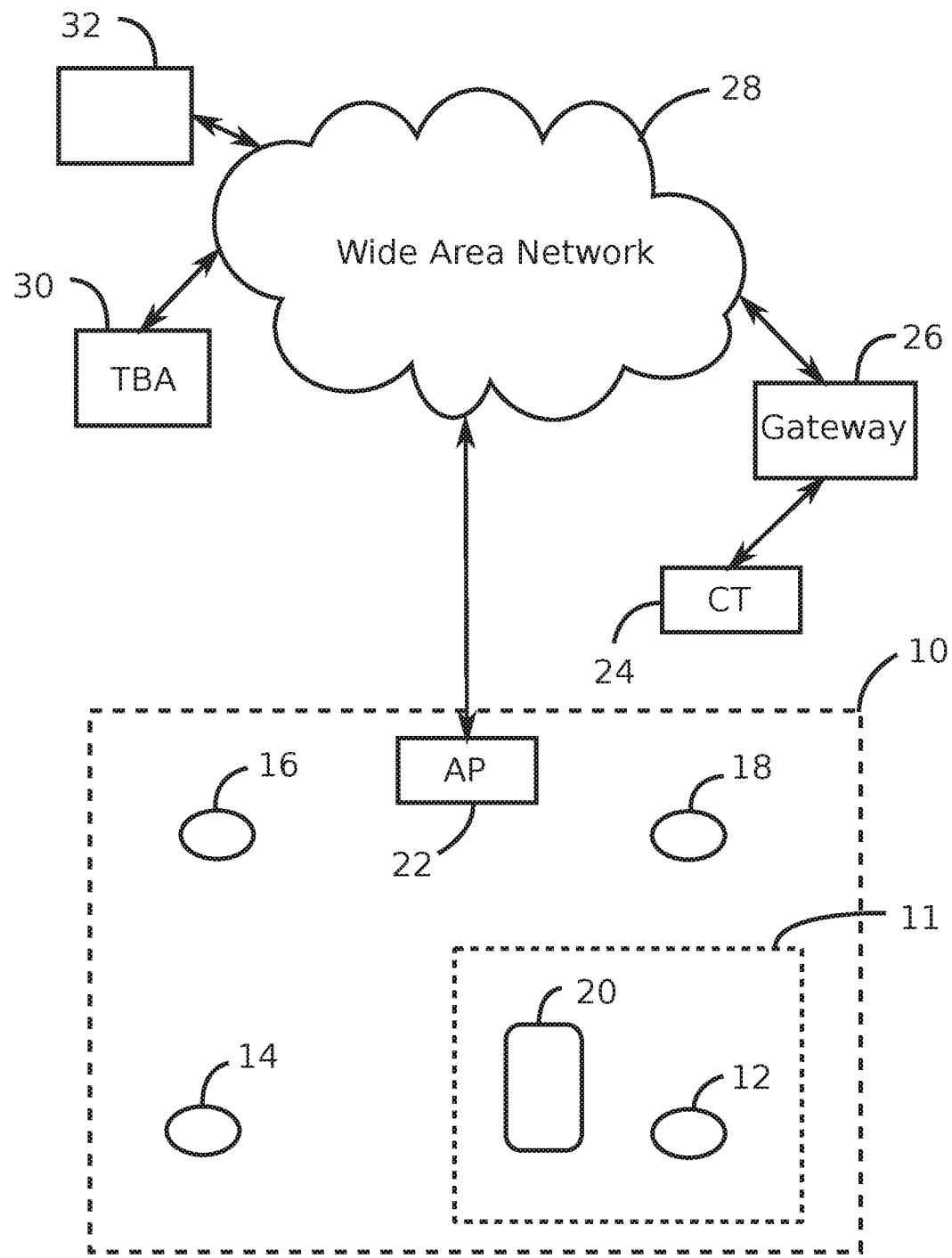
FIG. 1 is a block diagram of an exemplary operating environment comprising a trusted beacon system.

The following description is presented to enable any person skilled in the art to make and use the invention. For the purposes of explanation, specific nomenclature is set forth to provide a plural understanding of the present invention. While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 shows an example operating environment for a trusted beacon system. In one embodiment, the trusted beacon system comprises a beacon 12, a client device 20, and a trusted beacon authority (TBA) 30.

One or more beacons 12, 14, 16, 18 are in a beacon environment 10. Any desired number of beacons can be deployed in or about a beacon environment. The beacon environment can be an indoor space, such as a store, warehouse, building, sporting facility, or the like. The beacon environment can be an outdoor space, such as a parking lot, a space adjacent to a building, a college campus, outdoor festival area, a field, or the like. In some implementations, the beacon environment spans and comprises an indoor space and an outdoor space. The indoor space can also be a portion of an indoor space, such as a room 11 within a structure. The indoor space can also comprise a portion of unpartitioned or semi-partitioned in door area, such as a department area or checkout area of a store having an open floor plan.

In some embodiments, the client device 20 can communicate with the trusted beacon authority 30 wirelessly through one or more networks, such as a local network and/or a wide area network (WAN) 28, such as the Internet. In some applications, the client device can connect to the trusted beacon authority 30 through an access point 22, such as via WiFi wireless communication. In some applications, the WiFi wireless communication is according to IEEE (Institute of Electrical and Electronics Engineers) 802.11 standards. The client device 20 comprises a wireless transceiver that can detect radio frequency signals broadcast from one or more beacons when the client device is within a communicating range of the corresponding beacon(s). The radio frequency signals may comprise and advertising packets from the beacons. In some applications, the client device 20 can communicate with the trusted beacon authority 30 through a cellular tower 24, a gateway 26, and the wide area network 28 or other networks.

Figure 13:
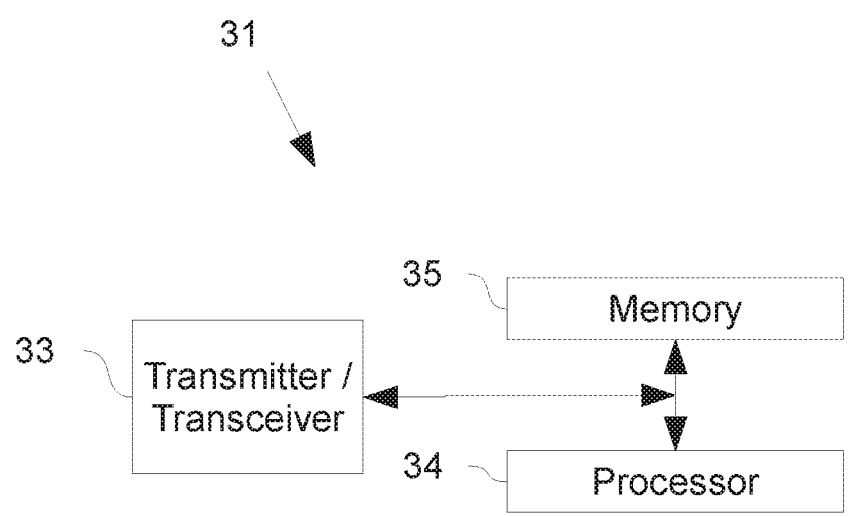
FIG. 13 is a block diagram of an exemplary electronic beacon architecture usable with the trusted beacon system.

In some embodiments, the beacons each comprise a beacon architecture 31 comprising a processor 34, a memory 35, and a radio transmitter or transceiver 33, as shown in FIG. 13. Each of the processor 34, a memory 35, and a wireless transmitter or transceiver 33 are connected to each other by one or more internal communication channels. The memory may comprise a non-volatile memory such as flash memory and/or a volatile memory such as RAM. Such components are in communication with one another across one or more communication channels, such as shown in FIG. 13. In some embodiments, the wireless transmitter or transceiver is a wireless radio transmitter or transceiver. In some embodiments, the beacons comprises a battery. In some embodiments the beacons are connectable to an external power source, such as via a powered USB connection. Other architectures for a beacons are possible, including architectures with more or fewer components.

In some embodiments, the beacons 12, 14, 16, 18 can be Bluetooth® beacons. Bluetooth® is a wireless technology standard for transmitting and or receiving data range using radio waves, such as shortwave UHF radio waves in the ISM band from 2.4 to 2.485 GHz. There are at least two forms of Bluetooth wireless technology, one is Bluetooth® basic rate and the other is Bluetooth® low energy. In some embodiments, the beacons can be Bluetooth® low energy (BLE) beacons complying with Bluetooth® Core Specification 4.0, 4.1, or 4.2.

In some embodiments, the beacons have a wireless transmission range depending on the transmission power and/or protocol used, which can for example provide a transmission range up to 1 meter, up to 10 meters, up to 60 meters, or up to 100 meters from the beacon. In some embodiments, the beacon has a wireless transmission range of any incremental distance between 0.25 meters up to 160 meters, inclusive. In some embodiments, the beacons are not Bluetooth beacons but operate on one or more other radio bands or frequencies, such as 900 MHz.

Beacons 12, 14, 16, 18 wirelessly broadcast advertising packets comprising PDUs (protocol data units). The PDUs may comprise a header and a payload. The header can be detected and read by client devices 20 when the client devices are configured to listen for such advertising packets, such as when the beacons are running in scan mode. To broadcast advertising packets, in some embodiments, an advertising event is started on the beacon, where the same advertising packet is transmitted sequentially on each of three advertising channels as defined in the Bluetooth Core Specification 4.2. There are four different types of advertising packets defined by the Specification: non-connectable advertising, discoverable advertising, general advertising, and directed advertising. When a beacon is set to broadcast in non-connectable advertising packets, the beacon transmits wirelessly a string of data but does not respond to a request from a client device to establish an authenticated connection. An authenticated connection between a beacon transmitter and a client device usually involves the client device first providing a passcode other authenticating information to the beacon before the beacon will form an authenticated connection with the client device. The advertising packets do not necessarily need to contain any commercial adverting or advertisements in the nature of communications used to promote or sell something. Therefore, advertising packets may, in one application, generally announce the existence of the beacon transmitting the advertising packets.

The iBeacon protocol developed by Apple Inc. (Cupertino, Calif.), is an example BLE protocol for proximity sensing. The iBeacon protocol defines identifiers and data elements that can be defined by application developers and users. The iBeacon protocol allows client devices 20 to listen and detect, as a background process, advertising packets from a beacon operating according to the iBeacon protocol. Once an application is installed on the client device, it can operate in the background until a beacon transmitting under the iBeacon protocol is discovered. The packets received from the beacon transmitting under the iBeacon protocol can be directed to other applications installed on the client device or it can be used to initiate action on the client device with or without user intervention. In some applications, beacons are used by an application or operating system running on the client device 20 to determine the physical location of the client device 20 and/or to trigger an action on the client device 20.

Each beacon is assigned or comprises a beacon identifier. The beacon broadcasts/transmits an advertising packet to nearby listening devices, such as client device 20, to announce its presence and to provide basic information about the beacon. A beacon can use this advertising capability to transmit a beacon identifier to listening devices. The beacon identifier can be any data, such as a universal unique identifier (UUID), uniform resource locator (URL) or arbitrary piece(s) of data. Since, in one implementation, the devices that receives advertising packets are not required to either request or connect to the beacon, the listening devices do not announce their presence and can remain anonymous.

When the client device 20 comprises a location determining function, the client device can use a beacon identifier to determine the client device's location if it can trust the validity of the beacon identifier. If each beacon advertises a beacon identifier and if the physical location of the beacon is known and secure, the location of the client device can be determined by looking up location information corresponding to the beacon's identifier. When the client device is within range of the beacon's advertising packets, the client device can extracting the beacon identifier from the advertising packet(s) and looking up that beacon identifier in a table or database to find the location information corresponding to that beacon identifier. Then knowing the broadcasting distance/range of a beacon, the client device 20 can determine or estimate its geolocation. In some embodiments, the strength of the beacon's broadcasting signal is another factor that can be used to further identify the location of the client device.

FIG. 2A shows an example location lookup table for four beacons. Each row of the table corresponds to one beacon. The first column of the table contains the beacon identifier. The second column of the table contains a location code. In some embodiments, the location code is an arbitrary number that corresponds to the location of the beacon. In some applications, the location code comprises latitude and longitude coordinates. In some applications, the location code comprises a text description of the location of the beacon, as is shown in FIG. 2. In one example, each of the UUIDs in rows one through four corresponds to the beacon identifiers for beacons 12, 14, 16, 18, respectively.

FIG. 2B shows another example of a look up table for nine beacons. In this example, UUIDs of each of the beacons are identical. The major and minor values instead distinguish the beacons from each other. In this example, all beacons in the Chicago location have a major value of 1, all beacons and the New York location have a major value of 2, and all beacons in the Portland location have a major value of 3. Each location has three beacons, one in each department. The departments are defined by the minor values, such as minor value 10 corresponding to the checkout area, minor value 20 corresponding to the electronics department, minor value 30 corresponding to the service department. Therefore combining the UUID, the major value, and the minor value results in a unique beacon identifier for each beacon.

In some embodiments, two or more beacons may have the same beacon identifier. In one implementation, multiple beacons can have the same beacon identifier where those beacons are deployed to cover a geographic area that is larger than the transmission range of one beacon. However, such beacons will carry the same beacon identifier because each beacon is intended to convey information about the overall larger geographic area in which those beacons are deployed.

A location application running on the client device 20 can receive the advertising packet from beacon 12, if the client device is within the transmitting range of beacon 12. The client device 20 can extract the beacon identifier from the advertising packet received. The client device then can look up that beacon identifier, such as based on the UUID column of the table shown in FIG. 2 and identify UUID 12D3C20E-1BBE-493F-B36D-7E72FDE98618 as corresponding to the checkout area location of Acme Co.'s store in Chicago, Ill. The location application can then conclude that the client device is within a predetermined distance of the beacon 12 located in the checkout area.

In some embodiments, the location application can determine the relative distance between the client device 20 and the beacon 12 by measuring the signal strength received from the beacon. Based on a pre-correlated lookup table of signal strength and distances, the location application can determine or estimate the distance between the client device and the beacon based on the signal strength. A higher signal strength will indicate that the client devices closer to the beacon and a lower signal strength will indicate the client device is further from the beacon. In some applications, rather than exact distances between the client device and the beacon, range indicators such as immediate, near, far can be provided correlated to signal strength. The range indicators may correspond to predefined distances. In one example, an immediate value would correspond to being closer than 1 meter from the beacon, a near value would indicate being within 1 to 3 meters from the beacon, and a far value would indicate the client device is more than 3 meters from the beacon.

When listening devices, such as client device 20, do not establish an authenticated connection to a beacon, the beacon can broadcast a digitally signed beacon identifier so that the listening devices can verify that the transmitted beacon identifier corresponds to the beacon and has not been spoofed or imitated, as may be done by an unauthorized party. The beacon identifier can be digitally signed using a cryptographic hash algorithm and asymmetric key encryption. Further the beacon can be issued a digital certificate verifying the public key associated with the beacon.

Figures 3, 4:
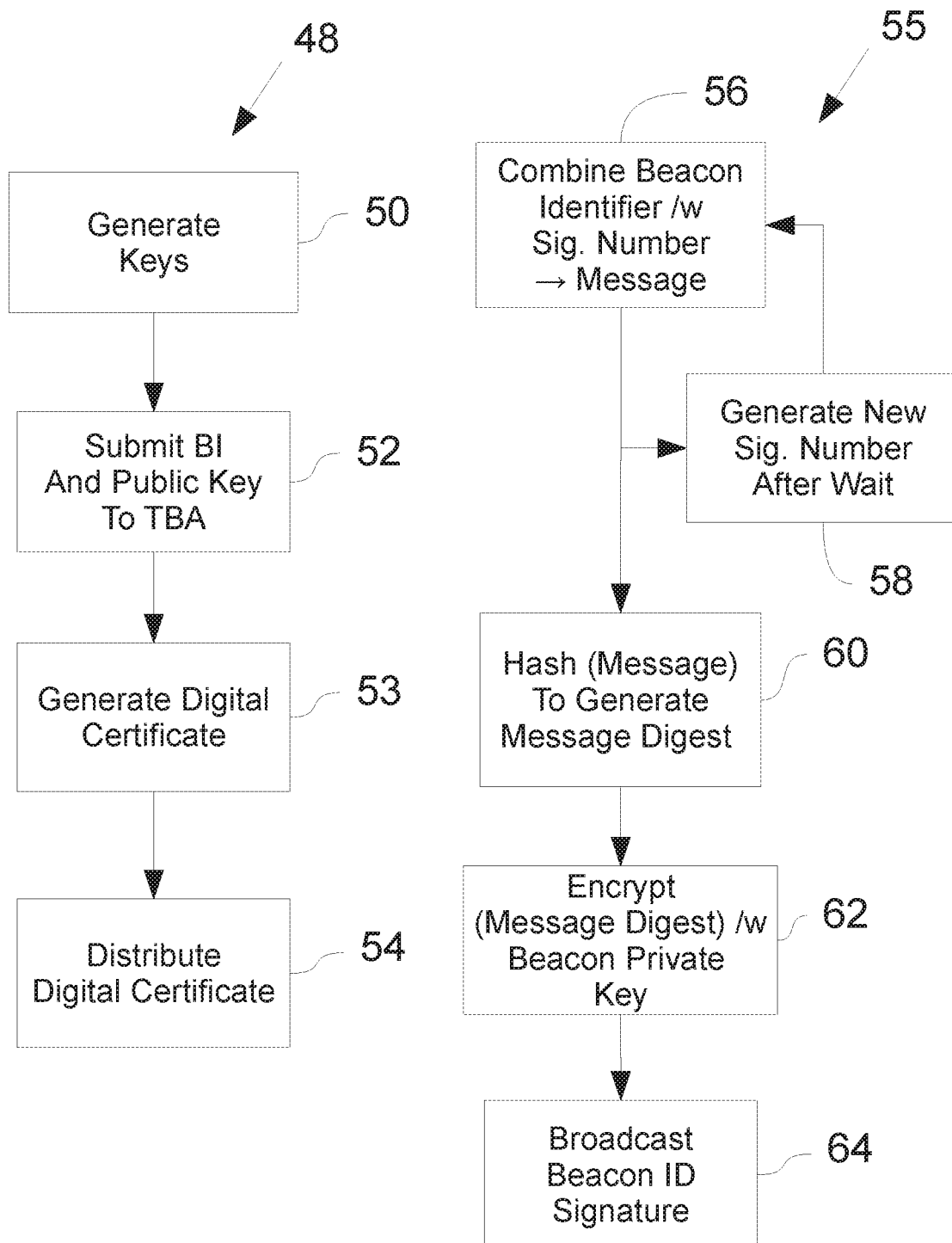
FIG. 3 is a flow diagram of an exemplary beacon certificate process of the trusted beacon system.
FIG. 4 is a flow diagram of an exemplary beacon identifier signature function of the trusted beacon system.

FIG. 3 shows an exemplary beacon certificate function 48 for generating a digital certificate for a beacon. A digital certificate is created for each beacon, such as beacons 12, 14, 16, 18.

Asymmetric Key Encryption

At step 50, a pair of asymmetric keys are generated for a given beacon for asymmetric key encryption (AKF). Each beacon will have its own pair of asymmetric keys. The pair of asymmetric keys comprise a public key and a private key. The pair of asymmetric keys may be generated by a key generating program operating on the beacon. Alternatively, the pair of asymmetric keys may be generated by another electronic device having a key generating program and the private key and public keys may be securely delivered to the beacon. The secure delivery may comprise locally physically connecting to the beacon and transferring the keys. Alternatively, the secure delivery may comprise establishing a secure network or other connection to the beacon and transferring the keys across the secure connection to the beacon.

In public key cryptography, such as asymmetric key encryption, encryption performed with one key can be decrypted only by the other member of the key pair. But, possession of one key does not enable the practical derivation of the other key. Therefore, the public key can be used to decrypt a message that was encrypted with the corresponding private key to result in the original message. And, the private key can be used to decrypt a message that was encrypted with the corresponding public key to result in the original message. The public key can be disseminated publicly and widely. But the private key must be kept secret, such as remaining known only to the private key owner. In one example, deciphering the enciphered (encrypted) form of a message M yields M, thus, $D(E(M))=M$. Also, if a message M is first deciphered and then enciphered, M is the result, thus, $E(D(M))=M$.

Asymmetric key encryption relies on cryptographic algorithms, which are based on mathematical problems that have no efficient solution, including but not limited to those in integer factorization, discrete logarithm, and elliptic curve relationships. A strength of asymmetric key encryption is in the impossibility or computational impracticality for a private key to be derived or determined from its corresponding public key. Therefore, the public key can be published without compromising security. Security generally depends on keeping the private key secret.

One exemplary algorithm for asymmetric key encryption is that generally known as RSA. One implementation of RSA is described in U.S. Pat. No. 4,405,829, which is herein incorporated by reference.

Under one RSA implementation, the key pair is generated by the following. Choose two distinct prime numbers p and q. The prime numbers p and q should be chosen at random. The integers p and q should be similar in magnitude but differ in length by a few digits. Next, compute n as a product of prime numbers p and q, i.e. n=p·q. By selecting p and q that are each large prime numbers, the resultant composite number n will also be large and therefore it will be difficult to factor n. Next, compute $ø(n)=ø(p) \, ø(q)=(p-1)(q-1)=n-(p+q-1)$, where ø is Euler's totient function. Then, choose integer d to be a large, random integer which is relatively prime to $(p-1)(q-1)$, i.e. verify that d satisfies: $\gcd(d,(p-1)(q-1))=1$, where gcd means greatest common divisor. Next, compute integer e from p, q, and d to be the multiplicative inverse of d, modulo $(p-1)(q-1)$. Therefore, $e \cdot d \equiv 1 \pmod{ø(n)}$. The public key comprises e and n. The private key comprises d and n.

Once the public and private keys are generated, under RSA, a message can be encrypted and decrypted as follows. First, represent the message (M) as an integer between 0 and n−1, such as by an agreed protocol known as a padding scheme. The message may need to be broken into blocks so that the integer representation of M is less than n, each block of M encrypted and decrypted as follows. The message (M) is encrypted by rising it to the eth power of modulo n. So, ciphertext (C) is the remainder when $M^e$ is divided by n, thus $C \equiv M^e \pmod{n}$ for a message M. To decrypt the cyphertext (C), raise C to the dth modulo n, thus, $C^d \pmod{n}$. If multiple block are encrypted, then after decrypting each of the blocks they can be joined together to produce the original whole message M.

Another exemplary form of asymmetric key encryption is known as elliptic curve cryptography (ECC). An elliptic curve cryptosystem is based on points on and elliptic curve E defined over a finite field F. Elliptic curve cryptosystems rely for security on the difficulty in solving the discrete logarithmic problem. Certain elliptic curve cryptography systems and other exemplary cryptography systems are described in U.S. Pat. No. 5,159,632, which is herein incorporated by reference, except that statements in such patent regarding certain elliptic curve schemes being unsatisfactorily slow are not adopted and not incorporated by reference. Other elliptic curve cryptosystems, other than described in U.S. Pat. No. 5,159,632, may also be used. Further, while RSA and elliptic curve encryption are referenced above, other asymmetric key encryption algorithms and methods could be used.

Digital Certificate Generation

At step 52, the public key of the key pair generated is submitted, in a certificate signing request along with other optional information, to the trusted beacon authority (TBA) 30. The beacon identifier corresponding to the public key is also transmitted to the TBA 30 along with the public key. At step 53, the TBA generates a digital certificate for the beacon comprising the beacon identifier, the beacon's public key, a digital certificate signature, an identifier of the certificate issuer, e.g. the TBA. The digital certificate may comprise other information or attributes, such as those defined by the X.509 standard. The X.509 standard, may also be known as the ITU X.509 standard promulgated by Telecommunication Standardization Sector of the International Telecommunication Union. Then, at step 54, the TBA either holds the digital certificate for retrieval by receivers, such as the client device 20, and or distributes the digital certificate 81 back to the beacon or other location for storage and use.

TBA 30 issues and revokes digital certificates. A digital certificate certifies the owner of a public key by the name subject of the digital certificate. The TBA is what is known as a certificate authority or a certificate server in cryptography. The digital certificate is intended to prevent a malicious third party from deploying beacons that pretend to be authentic beacons deployed by the owner. The TBA may be operated by the enterprise deploying the beacons or the TBA may be operated by a third party that is trusted by the enterprise deploying the beacons 12, 14, 16, 18 and the users of the client devices 20.

In some embodiments, the TBA 30 comprises software or functions operating on a computer, which issues digital certificates for beacons when the TBA receives a certificate signing request from the authentic beacon owner or a party authorized be the beacon owner. The computer comprising the software or functions of the TBA may be a computer architecture 210 as described below in reference to FIG. 12. The certificate signing request may comprise certification request information such as the beacon identifier, the beacon's public key, and the encryption algorithm associated with the public key. The certificate signing request may comprise other information, such as additional information about the party controlling the beacons, additional information establishing the authenticity of the requester, and the like. In some applications, the certificate signing request is in the format required by PKCS (Public Key Cryptography Standards) No. 10.

In some applications, the digital certificate meets a X.509 standard. Under one X.509 standard, the digital certificate 81 comprises, a version number 82, a serial number 83, a signature algorithm ID 84, issuer name 85, not valid before date (and, optionally, time) 86, a not valid after date (and, optionally, time) 87, subject name 88, subject's public key information (e.g. public key algorithm 89 and subject's public key 91), extensions 93, and certificate signature 97.

In the example certificate 81 shown in FIG. 6, the version number 82 is 3 corresponding to version 3 of the X.509 standard. In some embodiments, the certificate 81 may have more or less data than is shown in FIG. 6. The serial number 83 is a unique serial number corresponding to this particular certificate. The certificate signature algorithm ID 84 provides the algorithm that is used to sign this digital certificate and create the certificate signature 97. In this case the certificate signature algorithm is SHA-1 with RSA encryption. The issuer name is Acme Trusted Beacon Authority which is an exemplary name that, in one implementation, corresponds to the trusted beacon authority 30. The not valid before field 86 comprises the date and time before which the certificate 81 is not valid. The not after field 87 comprises the date and time after which the certificate 81 is not valid. The subject name 88 comprises the beacon identifier, such as 12d3c20e1bbe493fb36d7e72fde98618000a0064 for beacon 12. The subject's public key algorithm 89 is identified as ECC Encryption. The subject's public key 91 is identified as ccc55da74887fd66a36fda0561d9c9798924f1d4eac1fb4442 a33e0f4940a5deb6c02a491327a24e. The extensions 93 provides optional additional validity limitations or conditions for the certificate 81. The certificate signature 97 provides the digital signature of this particular certificate 81.

When the TBA receives an authorized and valid certification signing request from the owner, or authorized party of the owner, of the beacon, for which the certificate signature is requested, then the TBA creates a digitally signed digital certificate 81. The digital signature 97 of a digital certificate usually involves two steps. First the content of the digital certificate to be signed is hashed with a cryptographic hash algorithm. Second the resulting hash digest is encrypted using an asymmetric encryption algorithm and the TBA's private key to create the digital signature. Therefore, the TBA comprises a TBA digital signature function. The TBA digital signature function comprises a cryptographic hash function and an encryption function.

Input data to a cryptographic hash algorithm is known as a message. The hash value that is returned from the hash algorithm based on the message is often called a message digest or hash digest. A cryptographic hash algorithm is a hash algorithm where it is considered practically impossible or computationally infeasible to re-create the input data (the message) from its hash digest alone. Therefore, the cryptographic hash algorithm is considered a one way hash algorithm. A hash algorithm is an algorithm that can be used to map data of some length to a data of a fixed length.

The TBA executes a cryptographic hash function, using a cryptographic hash algorithm, such as SHA-1, on the content of the certificate, such as on the content is fields 82-93. This creates a message digest of the certificate content. The TBA uses the TBA's private key to encrypt the message digest, using an asymmetric encryption algorithm, the output of which is the certificate signature 97.

Signing the message digest instead of the message (e.g. all of the content of the certificate) provides improved performance because the message digest will be much smaller than the message. Therefore less computational resources will be required to apply the encryption algorithm, such as an asymmetric key encryption algorithm, to the message digest.

The recipient of the digital certificate can then, as more fully explained below, decrypt the certificate signature with the TBA's public key, resulting in the message digest of the original content of the certificate. The recipient can then use the same hash algorithm, which is identified in the certificate, such as SHA-1, on the content of the certificate received (e.g. the content of 82-91, excluding the certificate signature) to create a check message digest. If the check message digest matches the received and decrypted message digest of the original content of the certificate, then the receiver knows that the content of the certificate is the same as the content of the certificate when the TBA 30 signed the certificate. In other words, the receiver knows to trust the beacon identifier and the beacon's public key identified in the certificate, as long as the receiver trusts the TBA 30. Any change that occurs in the content of the certificate during transit or before transit, but after signature, will result in a different message digest when the recipient runs the hash algorithm on the content of the certificate, and thus the certificate signature will not verify.

In some embodiments, the cryptographic hash function comprises the SHA-1 (Secure Hash Algorithm 1), the SHA-2 (Secure Hash Algorithm 2), or the MD5 (Message-Digest Algorithm). U.S. Pat. No. 8,954,754 discloses a SHA-1 hash algorithm in the background section of the patent, which is herein incorporated by reference. The SHA-1, SHA-2, and other secure hash algorithms are further explained in Secure Hash Standard, FIP PUB (Federal Information Processing Standard Publication) 108-4 published by the Information Technology Laboratory, National Institute of Standards and Technology, U.S. Department of Commerce.

Beacon Identifier Signature

Each beacon comprises a beacon identifier signature function for digitally signing the beacon identifier. Similar to that explained above regarding the digital signature of the digital certificate, creating a digital signature of the beacon identifier comprises first hashing the beacon identifier to be signed and then encrypting the resulting message digest with the beacon's private key to create a digital signature of the beacon identifier. However, the hashing algorithm and asymmetric key encryption algorithm used for the digital signature of the beacon identifier do not need to be the same as those used in the digital signature of the digital certificate.

FIG. 4 shows an exemplary beacon identifier signature function 55. The signature function comprises a cryptographic hash function and an encryption function. A digital signature of the beacon identifier is created by first inputting the beacon identifier into a cryptographic hash function to create a message digest 73. Then the signature function 55 applies an asymmetric encryption algorithm to message digest using the beacon's private key, the output of which is the beacon identifier signature 74.

At step 56, the beacon generates or has previously generated a signature number, which is a random number or a pseudo random number. The signature function combines the beacon identifier with the signature number. After step 56, at step 58 a random number generator function or a pseudo random number function of the signature function waits a predetermined amount of time, such as 1 minute or 5 minutes, to generate a new signature number. When a new signature number is generated by the random number generator function or the pseudo random number function, the new signature number is transmitted to the beginning of the signature function at step 56 to generate a new signature based on the new signature number. Generating new random/pseudo random numbers and new signatures periodically changes the signature, which reduces the likelihood of a third party copying the signature, which increases the security provided by the signature. The random/pseudo random numbers may be known in cryptography as a nonce, which is designed to prevent replay attacks using old signatures. In some embodiments, the random or a pseudo random numbers are monotonically increasing numbers.

FIG. 5 shows exemplary data for one implementation of a beacon identifier signature function. In one implementation, the beacon identifier 67 comprises a UUID 68 of 16 bytes, a major value 69 of 2 bytes, a minor value 70 of 2 bytes. The signature number 71 comprises 6 bytes. Therefore, the following data can be used as an example, each in hexadecimal format: the UUID 68 is 12d3c20e-1bbe-493f-b36d-7e72fde98618, the major value 69 is 000a, the minor value 70 is 0064, and the signature number 71 is d6badcb31975. Then, the input message to the hash function is a combination of each those values in the order provided, resulting in a message 72 of: 12d3c20e1bbe493fb36d7e72fde98618000a0064d6badcb31975.

At step 60, the signature function runs a cryptographic hash algorithm on the message, which outputs a message digest. Using the example message 72 above, the message digest 73 is 878cdee8d247fccff2905a0142b485eb277419ed using a SHA-1 cryptographic hash function. At step 62, the signature function encrypts, using an asymmetric encryption algorithm, the message digest with the beacon's private key 76. In the example of message digest 73 above, the resulting beacon identifier (ID) signature 74 is: 5e0f11074dccdaa93a4cfcee669afb6836fdb6e7113ae030f7 97a8d6f92f3eb55fdcbd46b86acaa8 based on a private key 76 of 7f6955e3c884e40e72e9542e3117becbace53412, and an elliptic curve encryption algorithm using an exemplary elliptic curve encryption curve value of secp19er1. While the private key is disclosed here for explanation purposes, in actual implementation, the private key would be kept secret and protected on the beacon and would not be disclosed. In some embodiments, the private key is protected by being physically secured against unauthorized access within the beacon. In some embodiments, the private key is protected within a secure enclave on the beacon.

Broadcast

Figure 7:
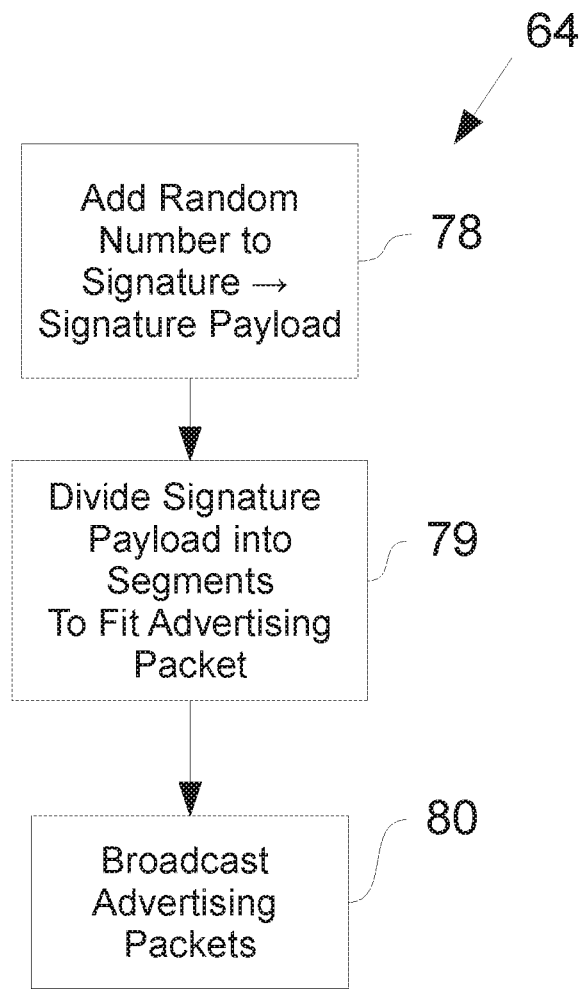
FIG. 7 is a flow diagram of an exemplary divide and broadcast function of the trusted beacon system.

The beacon ID signature 74 is then broadcast wirelessly by the beacon. An exemplary divide and broadcast function 64, which divides the beacon identifier signature, if necessary, and broadcasts the beacon identifier signature is shown in FIG. 7. The broadcast function 64 on the beacon can broadcast the beacon identifier 67 and the beacon ID signature 74 in one or more advertising packets. At step 78, the beacon ID signature 74 is combined with the signature number 71 that was combined with the beacon identifier 67 by the signature function 55 at step 56 to create a signature payload 77. The signature number 71 is appended to the end of the beacon ID signature 74, so an exemplary signature payload is: 5e0f11074dccdaa93a4cfcee669afb6836fdb6e7113ae030f 797a8d6f92f3eb55fdcbd46b86acaa8 d6badcb31975.

If the signature payload 77 is larger than the capacity of the beacon's advertising packet, then the signature payload 77 can be split up to fit in multiple advertising packets, at step 79.

If for example the advertising packet size limit is 30 bytes and the signature payload 77 is 40 bytes, then the payload will be split into two segments so that each segment fits within an advertising packet. After the split, a sequence number is prepended to the segment such that: segment 1={sequence number} {(payload/n)}; segment 2={sequence number} {(payload/n)}; ... segment n={sequence number} {(payload/n)}. For example, segment 1=00{(payload/n)}; segment 2=01 {(payload/n)}; ... segment n={n} {(payload/n)}. For the signature payload 77 shown in FIG. 5, segment 1 comprises 005e0f11074dccdaa93a4cfcee669af66836fdb6e7113ae0 and segment 2 comprises 0130f797a8d6f92f3eb55fdcbd46b86acaa8d6badcb31975. The prepended sequence number allows the receiver, such as client device 20, to combine the segments in the proper order to reveal the signature payload 77.

At step 80, the function 64 broadcasts adverting packets comprising the beacon identifier and the signature payload, or segments of the signature payload. The function 64 can broadcast beacon identifier and the beacon identifier signature, or segments of the beacon identifier signature or signature payload in any order. For example, the first broadcast packet(s) may comprise the beacon identifier, the second broadcast packet(s) may comprise the first segment of the signature payload, and the third broadcast packet(s) may comprise the second segment of the signature payload. Then function 64 can repeat that broadcast sequence. In some embodiments, the function 64 alternates between broadcasting the beacon identifier in one or more advertising packets and then broadcasting the signature payload or a segment thereof in one or more advertising packets. In some embodiments, the function 64 first broadcast one or more segments of the signature payload and then broadcasts the beacon identifier and then repeats. In some embodiments, the advertising packet may be large enough to hold the signature payload 77 and the beacon identifier 67 and therefore the signature payload and the beacon identifier can be broadcast by the broadcast function in an advertising packet without segmenting. In some embodiments, the beacon identifier is included in the signature payload.

In some embodiments, the broadcast function 64 does not broadcast the beacon identifier 67 but only broadcast the signature payload or the beacon identifier signature. In such case, a second beacon can broadcast the beacon identifier corresponding to the beacon identifier signature transmitted by the broadcast function 64 of the first beacon. Therefore two beacons broadcasting in the same geographic area can together provide the beacon identifier and the beacon identifier signature, respectively.

Signature Verification

Figure 8:
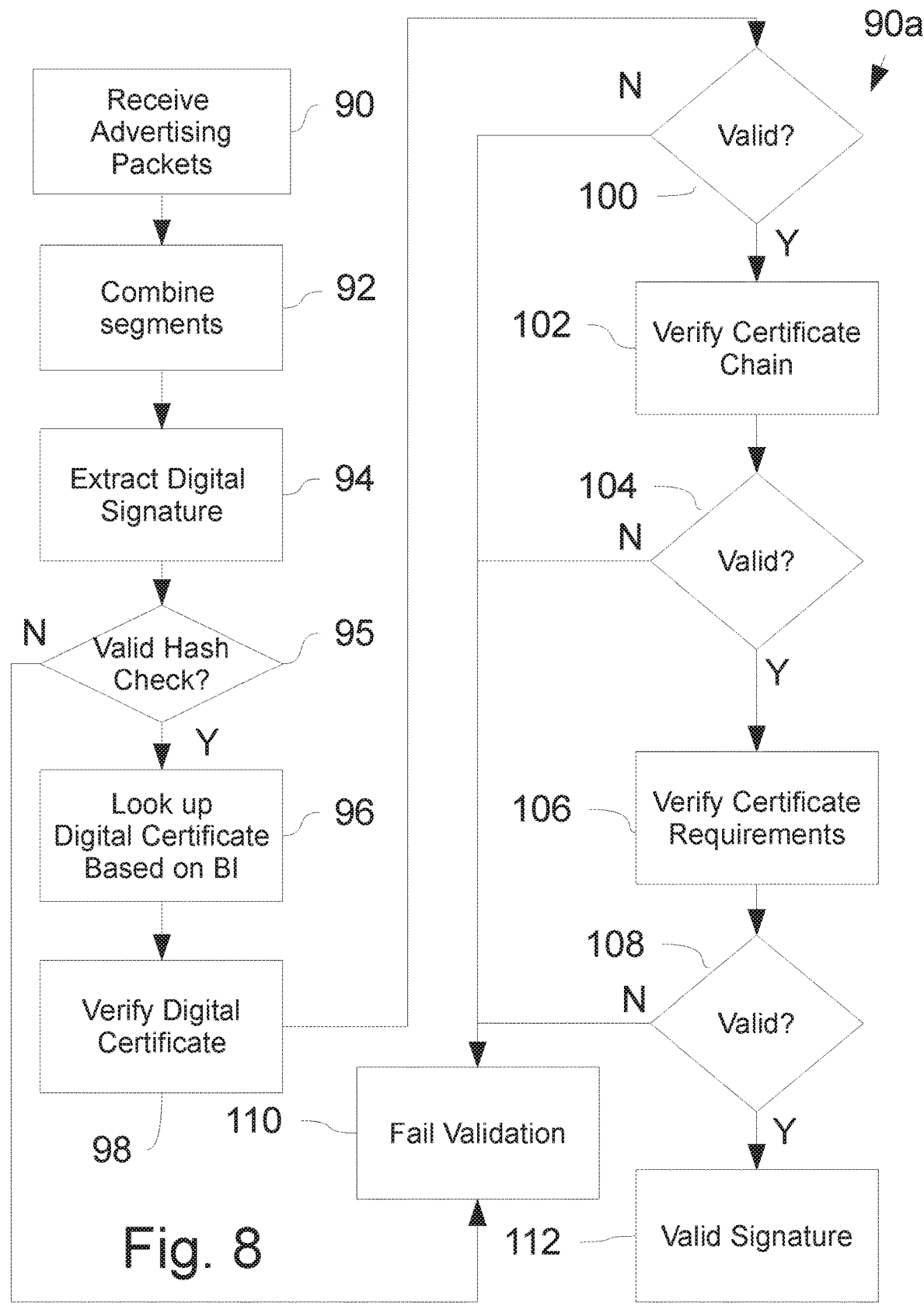
FIG. 8 is a flow diagram of an exemplary beacon identity verification function of the trusted beacon system.

The client device 20 comprises a beacon identity verification function. An exemplary process for the beacon identity verification function 90*a* is shown in FIG. 8. At step 90, the verification function receives advertising packets from the beacon.

The advertising packets received by the beacon at step 90 may comprise the beacon identifier and the beacon identifier signature. In some embodiments, the beacon identifier is transmitted by the beacon in a different packet from the beacon identifier signature. In some embodiments the beacon identifier is transmitted in the same packet as the beacon identifier signature. If the verification function detects that a beacon identifier signature is within the advertising packet and the beacon signature has been broken into multiple segments, then at step 92 the verification function will combine the segments according to the segment sequence numbering that is prepended in the advertising packet to result in the signature payload 77. In some embodiments, the client device 20 is pre-programmed to expect the beacon identifier signature to arrive is a predefined number of segments.

At step 94, the signature payload 77 is deconstructed into the signature 74 and the random number 71. Then the verification function decrypts the signature 74 using the public key corresponding to the beacon transmitting the signature payload 77 to result in a decrypted hash digest. The function 90*a* determines the appropriate public key based on the beacon's beacon identifier 67. The verification function can obtain the beacon's public key from the beacon directly, from a beacon certificate that is preloaded on the client device 20, or by requesting the beacons certificate from the beacon, the TBA, or another source.

Next, at step 95, the verification function generates a check hash digest based on the beacon identifier and the random number 71 using the same hash algorithm that was used to create message digest 73 before signature and transmission. The appropriate hash algorithm may be predefined on the client device 20 or may be discovered as defined in the digital certificate of the corresponding beacon. If the decrypted hash digest is identical to the check hash digest, then the verification function knows that the content of the signature payload, e.g. the beacon identifier, was not changed after original hashing, and the verification function proceeds to step 96. If the check hash digest is not identical to the decrypted hash digest than the content of the signature payload has changed since signature and the verification function proceeds to step 110 to fail validation. If validation fails, the beacon's identifier is not trusted as corresponding to authentic beacon.

Certificate Verification

To ensure that public key of the beacon broadcasting the advertising packet and the signature payload is legitimately associated with the expected owner/provider/subject, and to ensure that the communications between the beacon 12 and the client device 20 are not subject to the problem known in cryptography as the man-in-the-middle attack, the client device 20 can look up the digital certificate of the beacon corresponding to the beacon identifier received. Therefore at step 96, the client device 20 queries the trusted beacon authority 30 with the beacon identifier for which it wants to verify the validity of the associated public key. The device 20 downloads the digital certificate associated with the beacon corresponding to the beacon identifier.

If the digital certificate corresponding to the beacon has already been downloaded and verified, and the verification is not stale, the public key received corresponding to the beacon identifier (if received other than from the TBA) can be compared to the public key in the digital certificate, without the need of re-verifying the certificate according to step 98-108. The beacon identity verification function on the client device can be configured to determine that a previously verified digital certificate is stale after a predetermined amount of time. When a digital certificate verification is stale, the beacon identity verification function can proceed to re-verify the digital certificate by retrieving, from the TBA, the digital certificate corresponding to the beacon at step 96 and continuing the verification steps with respect to that certificate. In some embodiments, the client device 20 is already provided with the digital certificates of a number of beacons from a trusted source therefore does not need to retrieve the certificate on demand from the trusted beacon authority 30, unless the digital certificates are stale.

As explained above, the digital certificate 81 comprises at least the beacon identifier, the beacon's public key, and a certificate signature. At step 98, the client device 20 applies the trusted beacon authority's public key to decrypt the certificate signature using the certificate signature algorithm to result in the certificate signature hash digest. Then the client device 20 computes a check hash digest using the hashing algorithm used to create the certificate signature and the content of the certificate. If the check hash digest matches the certificate signature hash digest then the client device 20 knows that the content of the certificate has not changed since it was signed, and the verification function proceeds to step 102. If the check hash digest does not match the signature hash digest then at least some of the content of the certificate has been changed after it was signed, the certificate cannot be trusted, and either the verification function fails validation at step 110 or the verification function returns to step 96 to seek to retrieve a new digital certificate corresponding to the subject beacon from a trusted source, and thereafter continue with the verification function 90*a*.

Figures 9, 10:
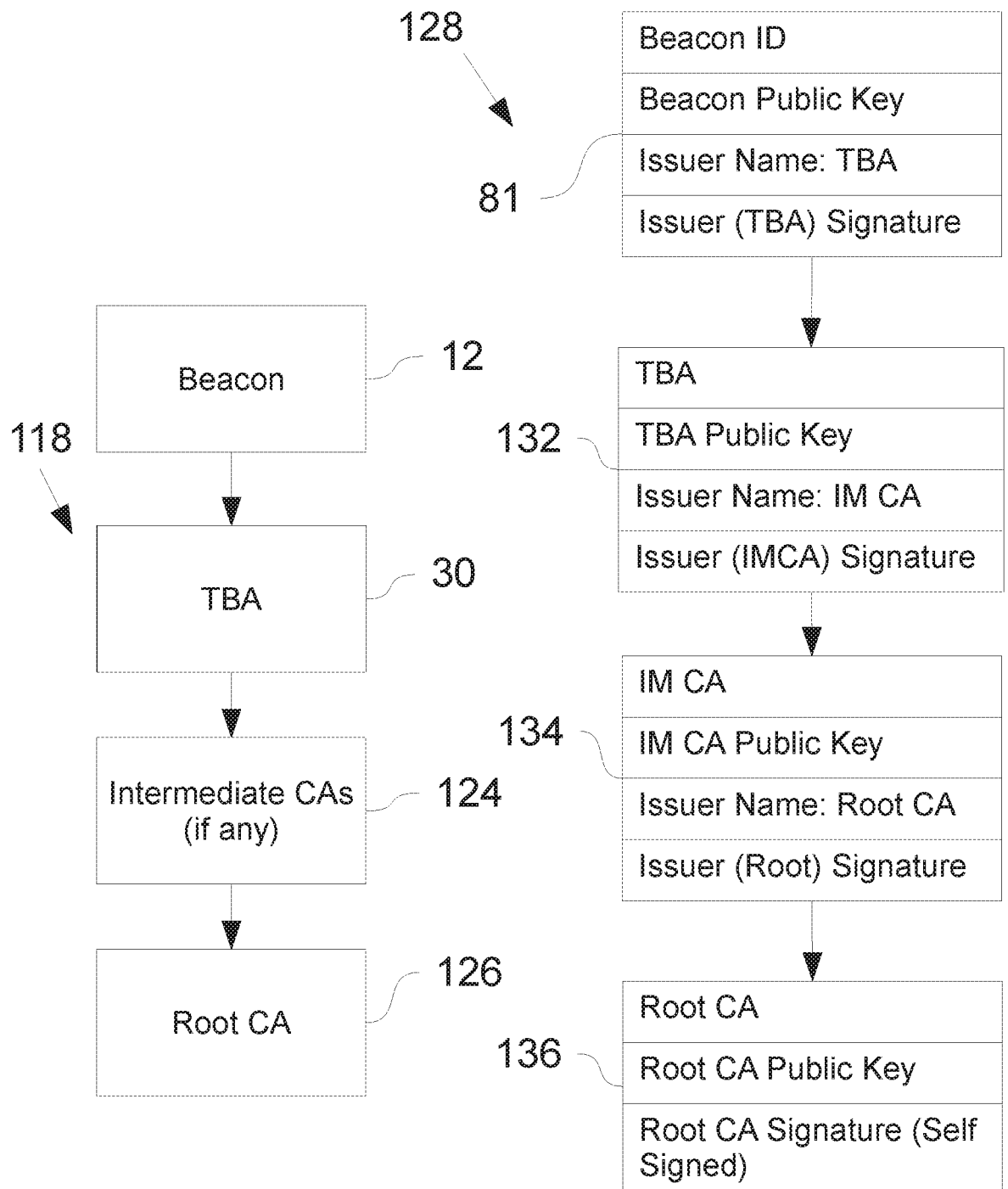
FIG. 9 is a block diagram of a beacon and a chain of certificate authorities.
FIG. 10 is a block diagram of a chain of digital certificates.

In some embodiments, the trusted beacon authority is in a chain of certificate authorities 118, such as shown in FIG. 9. The trusted beacon authority 30 can receive its digital certificate from either one or more intermediate certificate authorities 124 or directly from a root certificate authority 126. If there is an intermediate certificate authority 124, the intermediate certificate authority either received its certificate authority from an immediately preceding other intermediate certificate authority or received its certificate from the root certificate authority 126.

FIG. 10 shows a chain of digital certificates 128 corresponding to the chain of certificate authorities 118. The digital certificate 81 of beacon 12 is issued by the trusted beacon authority 30. As explained above, the trusted beacon authority's public key decrypts the signature of the digital certificate 81. The public key of the intermediate certificate authority 124 decrypts the digital signature of the trusted beacon authority certificate 132. The public key of the root certificate authority 126 decrypts the signature of digital certificate 134 of the intermediate certificate authority 124 (if only one intermediate certificate authority is in the chain). The root certificate authority is a certificate that is trusted because it is delivered by a trusted source such as the root certificate authority itself.

Therefore, in a certificate chain, the issuer of each certificate, except the last issuer, matches the subject of the prior certificate in the list. For example, the TBA 30 is the issuer of certificate 81 and is the subject of certificate 132. Each certificate, except the last certificate, is signed by the private key corresponding to the prior certificate in the chain. For example, TBA certificate 132 is signed by the private key of the intermediate certificate authority (IM CA) corresponding to certificate 134. The last certificate in the chain is a trust anchor.

In some embodiments, the message of each signature is hashed first before it is signed by the corresponding private key. Therefore to check the validity of the signature, the content of the certificate is rehashed with the proper hash algorithm to generate a check hash digest which is compared to the hash digest that is decrypted using the public key. When the check hash digest matches the hash digest of the signature the signature is verified. When the certificate signature is verified, the content of the certificate is verified is unchanged since the certificate was signed.

Therefore, at steps 102 and 104, the chain of certificates from the trusted beacon authority to any prior certificate authority is verified, by checking the validity of the signatures of each corresponding certificate in the chain. If any of the digital signatures of the certificates in the chain are not valid, the validation function goes to step 110 to fail validation. Any additional validity requirements of the certificates in the certificate chain may also be checked. If those additional validity requirements, beyond a valid digital signature, are not met, then validation will fail. Exemplary additional validity requirements of digital certificates are discussed below.

If the certificate chain is valid, the validation function goes to step 106 to verify that any additional validity requirements of the beacon certificate are met. The additional validity requirements of the beacon certificate can be specified in the extensions field 93 of the X.509 certificate or in other fields. Additional validity requirements may comprise geocoordinates for a location, an IP address, a network segment, a time of day or a time span, a WiFi network name, or the like. In the case of geocoordinates for a location, the certificate may require that the corresponding beacon is only to be used in a particular geographic area. If the beacon is detected broadcasting in a geographic area outside the permitted geographic area defined in the certificate, then the certificate validation fails. In the case of a network segment, the certificate may require that the corresponding beacon is only used on a particular computer network segment. If the beacon is located on a network segment other than the permitted network segment, then the certificate validation fails. In the case of a time of day requirement, the certificate may require that the beacon can only be used during a given period in the day. If the beacon is broadcasting outside that permitted period of day, then the certificate validation fails. In the case of a Wi-Fi network name, such as an SSID, limitation, the certificate may require the client device 20 be operated only on a Wi-Fi network having a given name. If the client is operated outside of that Wi-Fi network name when the client checks the validity of the certificate, the certificate validation fails. In another embodiment having a network segment limitation, the certificate may require that the client device 20 only be used on a particular computer network segment. If the client device is located on a network segment other than the permitted network segment during validation of the certificate, then the certificate validation fails. In some embodiments, these and other additional validity requirements of the digital certificate 81 are checked at step 98.

In some embodiments, the validation function, at step 96 or 98, will check with the TBA whether a previously valid certificate has been revoked. And if a certificate has been revoked by the TBA and no new certificate exists for the revoked beacon, then the validation function will fail validation. A certificate may be revoked if, for example, the beacon corresponding to the certificate is known to be lost or stolen.

If no event or condition causes the verification function to fail validation, then the verification function proceeds to step 112 and returns a valid signature confirmation. When the verification function returns a valid signature confirmation, the client device 20 knows that the beacon identifier is valid and has not been spoofed. Therefore the client device can proceed with functions that require a cryptographically verified identity of a beacon.

In some embodiments, the client device 20 does not perform the certificate validation function. Instead, the client device polls a remote certificate validation service 32. The remote certificate validation service may be a program or process operating on a computer or server, such as a server having architecture 210, available across the network 28. The client device provides the certificate validation service with the beacon identifier and public key corresponding to that beacon identifier. Then the certificate validation service 32 performs the steps described above, such as steps 96 through 108, to determine whether a valid certificate exists with respect to the provided beacon identifier. If the remote certificate validation service 32 finds that the certificate and any certificate requirements corresponding to the beacon identifier are valid, then the remote certificate validation service 32 sends that information to the client device 20. If the remote certificate validation service 32 finds the certificate or any certificate requirements corresponding to the beacon identifier are invalid, then the service 32 sends that information to the client device 20 and the corresponding beacon identifier is not trusted at step 110.

Example Applications

Beacons advertising valid cryptographically signed beacon identifiers can be used to enable location-based functionality or restrictions, such as where spoofing is a concern. A number of non-limiting examples of such use follow.

In one example application, a person, owner, tenant, or enterprise may desire to permit environmental control of a building or a portion of a building through an application running on the client device 20, only when that client device 20 is located within a given building or portion of the building. If in this example it is assumed that the beacon environment 10 shown in FIG. 1, diagrammatically shows the boundaries of a building, and if it is assumed that the beacons 12, 14, 16, 18 do not transmit substantially beyond the boundaries of the building, then an application running on client device 20 can be programmed to enable the application to allow the user to control environmental functions of the building or portion of the building when the application detects the advertising packets of beacons 12, 14, 16, or 18 containing valid cryptographically signed beacon identifiers corresponding to those beacons.

The environmental functions that such an application might control are: building temperature, or individual room temperature, lighting, or other environmental settings or functions of systems of the building. Other functions of a building or portion of a building could also be controlled such as, lawn care systems, notification systems, fire or other emergency equipment, The application can be programmed so that such control is not enabled when the client device fails to detect advertising packets containing a valid cryptographically signed beacon identifier from authorized beacons, such as beacons 12, 14, 16, or 18. Further the application could be programmed to only allow a user to control environmental or room functions or systems when the client device 20 detects an advertising packet containing a valid cryptographically signed beacon identifier of a beacon within or adjacent to that room, such as room 11. In this way, an application for use on a client device 20 can be released publicly to anyone, but such application would only allow certain functions of the application to be operational when the device is within range of a predefined one or more beacons advertising a valid cryptographically signed beacon identifier.

In another example application, an application running on the client device 20 can be programmed to enable the display or redemption of a coupon on that client device only when the client device is within the range of a predefined one or more beacons advertising validly signed beacon identifiers. In such case, a third party is prevented from spoofing the beacon in another location and generating one or more coupons at locations other than those desired by the owning person or enterprise.

In another example application, an application running on the client device 20 can be programmed to enable authentication only when the client device detects it is within a predefined range of one or more beacons advertising validly signed beacon identifier(s). This enables location to be one of the forms of a multiple factor authentication. The enabled authentication may occur within the application running on the client device or may be for authentication through another application running on the client device.

In another example application, an application running on the client device can be programmed to enable the completion of financial transactions only when the client device detects it is within a predefined range of one or more beacons advertising validly cryptographically signed beacon identifier(s). For example, a user may purchase a product for pickup at a retail location. When the user arrives at the retail location with the client device 20 running the application, the application can detect that the user is at the location by detecting advertising packets comprising validly signed beacon identifier(s) of one or more advertising beacons, and the application can complete the transaction by processing or authorizing a charge to the user's credit card or other electronically enabled form of payment. Further, the application could notify retail store employees to deliver the goods to the user waiting in his or her car or waiting in a particular area of the retail store.

In another example application, the client device is attached or integrated with an object or piece of equipment. The client device can be configured to only operate if it detects it is within a predefined range of one or more beacons advertising validly signed beacon identifier(s). In another example, the client devices attached are integrated with a piece of equipment located in a checkout area. The client device can be configured to only operate if it detects it is within a predefined range of one or more beacons advertising validly signed beacon identifier(s) within the checkout area. Therefore the client device need not be a mobile device, instead it can be fixed to or contained within a stationary object or an object that the owner wants only to operate if it is within a particular geographic area. Further, the client application can be configured to prevent theft when used in conjunction with the system.

Example Client Architecture

Figure 11:
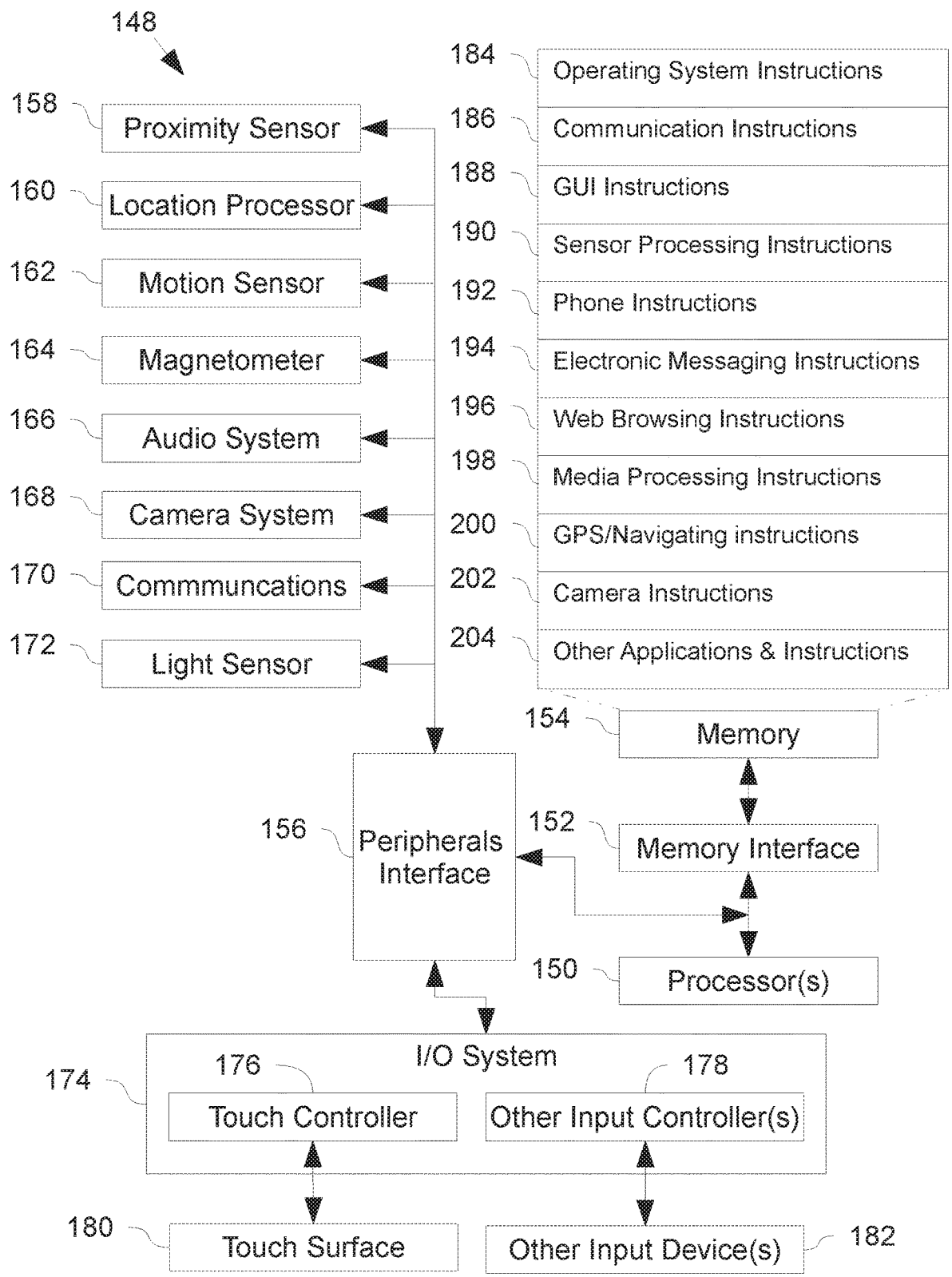
FIG. 11 is a block diagram of an exemplary client device architecture usable with the trusted beacon system.

FIG. 11 is a block diagram of an example client device architecture 148 for implementing the features and processes described herein, such as described in reference to client device 20. The architecture may be implemented in any mobile or stationary electronic device for implementing the features described herein, including but not limited to, desktop computers, portable computers, smart phones, tablet computers, wearable computers, portable electronics, and the like. The architecture 148 provides a processor 150 connected to a memory interface 152 and a peripheral interface 156 across one or more internal communication channels, such as a bus(es). The memory interface 152 is signal connected to the memory 154. A peripheral interface is connected to a proximity sensor 158, a location sensor 160, a motion sensor 162, and a magnetometer 164, an audio system 166, a camera system 168, a wireless communication system 170, and a light sensor 172. The peripheral interface is also connected to an input output system 174.

The devices, systems, and sensors can facilitate multiple functionalities of the device. For example, light sensor 172, the proximity sensor 158, and the motion sensor 162 can facilitate orientation, lighting, and proximity functions of the device. For example, the light sensor 172 can be used to facilitate adjusting the brightness of touch surface 180. In some implementations, the motion sensor 162 may be utilized to detect movement and orientation of the device. Therefore, display items can be presented according to a detected orientation. Other sensors, such as a temperature sensor, a biometric sensor, or other sensing devices may be connected the peripherals interface 156 to facilitate related functions.

The audio system 166 may be connected to one or more speakers and one or more microphones for facilitating audio playback and for facilitating voice enabled functions, such as voice recognition, digital recording, and telephony functions.

The camera system 168 may be connected to one or more cameras or optical sensors capable of capturing still image(s) and video. The optical sensor may be a charged coupled device or a complementary metal-oxide semiconductor optical sensor. The motion sensor may comprise an accelerometer and a gyroscope.

The location processor may comprise a GPS chip. The location processor may be used to provide georeferencing beyond explained above regarding beacon based location determination. The magnetometer can provide data to determine magnetic North.

Communications capabilities and functions may be facilitated through one or more communications systems 170, such as a wireless communication system and/or wired communications system. The wireless communications systems 170 may include radio frequency receivers and transmitters and/or optical receivers and transmitters. A wired communications system may be connected to the peripheral interface 156 and may include a port, such as a universal serial bus port, or other wired port connection that may be used to establish a wired connection to other computing devices.

The design of the communications system may depend on the communication network(s) or medium(s) on or over which the device is intended to operate. For example, the wireless communication system may be design to operate using standard or otherwise known protocols, such as, GPRS, enhanced data GSM environment (EDGE), IEEE 802.x (e.g., WiFi, WiMax), global system for mobile communications (GSM), code division multiple access (CDMA), Near Field Communications (NFC), Bluetooth® (including Bluetooth® low energy (BLE) and classic Bluetooth®). The wireless communication system may be configured to the device to synchronize with a host device using one or more protocols, such as, for example, the TCP/IP protocol, HTTP protocol, UDP protocol, and any other known or standardized protocol.

The input/output system or I/O system 174 may comprise a touch controller 176 and one or more other input controllers 178. The touch controller 176 is coupled to a touch surface 180. Touch surface 180 and touch controller 176 may be configured to detect contact and movement or break of contact or break of movement using one or more touch sensitivity technologies, such as capacitive, infrared, resistive, and surface acoustic wave technologies, as well as other proximity sensor arrays or other elements for determining one or more points of contact with touch surface 180. In one implementation, the touch surface is configured to display a virtual keyboard and/or other virtual buttons for use as an input/output device by the user.

The other input/output controllers 178 are connectable with other input/output devices 182, such as an infrared port, a USB port, a pointer device, a rocker switch, and/or one or more other buttons. In some applications, the one or more buttons may comprise an up and down button for volume control of a speaker and/or a microphone connected to the audio system 166.

The memory 154 may comprise random access memory, non-volatile memory, such as one or more magnetic disk storage devices, one or more optical storage devices, and/or false memory. The memory 154 may store an operating system and operating system instructions 184, such as OS X, ANDROID, Darwin, RTXC, LINUX, UNIX, or WINDOWS. The operating system instructions may provide for handling basic system services and for performing task involving hardware components.

The memory 154 may comprise communication instructions 186 to facilitate communicating with one or more additional devices, one or more computers or servers, such as described herein. The memory may comprise graphical user interface (GUI) instructions 188 to facilitate graphic user interface processing, including a touch model for interpreting touch inputs and gestures. The memory may comprise sensor processing instructions 190 to facilitate sensor-related functions. The memory may comprise phone instructions 192 to facilitate phone-related functions. The memory may comprise electronic messaging instructions 194 to facilitate electronic-messaging related functions. The memory may comprise web browsing instructions 196 to facilitate web browsing-related functions. The memory may comprise media processing instructions 198 to facilitate media processing-related functions. The memory may comprise GPS/Navigation instructions 200 to facilitate GPS and navigation-related processes. The memory may comprise camera instructions 202 to facilitate camera-related functions. The memory may comprise other instructions 204, such as for performing some or all of the processes described herein, such as regarding client device 20.

Each of the above identified instructions and applications may correspond to a set of instructions for performing one or more functions described above. These instructions do not need to be implemented as separate software programs, procedures, or modules. Memory 154 may include additional instructions or fewer instructions. Further, various functions of the device may be implemented in hardware and/or in software, including in one or more signal processing and/or application specific integrated circuits.

Other architectures for a client device are possible, including architectures with more or fewer components. For example, in some embodiments, the client device comprises a processor, a memory, a wireless receiver or transceiver, and one or more communication channels. The one or more communication channels signal-connecting the memory to the processor and signal-connecting the wireless receiver transceiver to the memory and the processor. The client device may be a stationary electronic device or a portable electronic device.

Example Server Architecture

Figure 12:
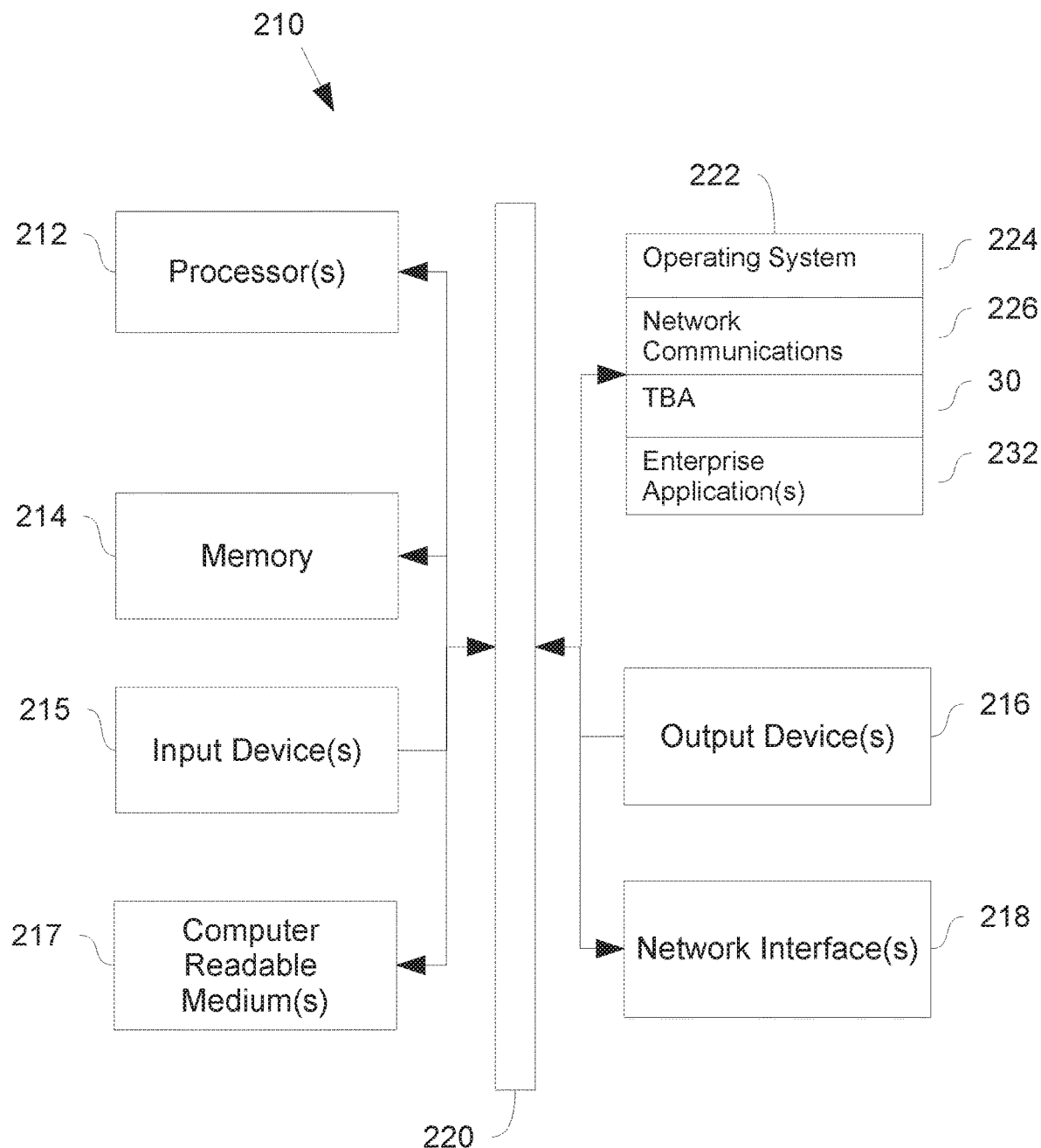
FIG. 12 is a block diagram of an exemplary server computer architecture usable with the trusted beacon system.

FIG. 12 provides a block diagram of an example server computer architecture 210 for implementing the features and processes described herein, such as in reference to the TBA 30 or to other server side functionality 232. Other architectures are possible, including architectures with more or fewer components. In some implementations, the architecture 210 comprises one or more communication channels 220, such as a bus that connect one or more processors 212, a memory 214, one or more input device(s) 215, one or more output device(s) 216, one or more computer readable medium(s) 217, and one or more network interface(s) 218. The one or more communication channels 220 allow the transfer of data, communications, and control signals between the various components connected to the channels 220.

The network interface(s) 218 may comprise wired or wireless network interfaces, such as an Ethernet wired network interface. The input device(s) 215 may comprise a keyboard, a mouse, and/or a touch-sensitive display. The output device(s) 216 may comprises a display, such as an LCD display. The computer readable medium(s) may comprise non-volatile media, such as optical or magnetic disks, or volatile media, such as RAM.

The computer readable mediums 217 or the memory 214 may comprise an operating system 224, network communication instructions 226, and the instructions for operating the Trusted Beacon Authority 30. The operating system can perform tasks, such as managing files and directories on the computer reasonable mediums 217 and memory 214, managing traffic on the one or more communication channels 220, recognizing input from input devices 215, providing output to output devices 216, among other tasks. The network communications instructions 226 can enable the establishing and maintain of network communications.

The steps, functions, processes, and capabilities described herein can be provided in the form of instructions stored in a computer readable medium and executable by a processor of a computing device to achieve the corresponding functions, processes, capabilities, or results.

From the foregoing, it will be observed that numerous variations and modifications may be effected without departing from the spirit and scope of the invention. It is to be understood that no limitation with respect to the specific apparatus illustrated herein is intended or should be inferred. For example, one or more component embodiments may be combined, modified, removed, or supplemented to form further embodiments within the scope of the invention. As a further example, steps provided in the flow diagrams of the figures, could be carried out in a different order to achieve desired results. Further, steps could be added or removed from the processes described. Therefore, other embodiments and implementations are within the scope of the invention.

The invention claimed is:

1. A method of determining a location of a client computing device based on wireless transmission from an electronic beacon, comprising the steps of:
   receiving wirelessly, on the client computing device, a one or more advertising packets transmitted from the electronic beacon, the one or more advertising packets comprising a beacon identifier signature and an received beacon identifier, where the beacon identifier signature is a digital signature;
   decrypting, on the client computing device, the beacon identifier signature using a public key associated with the received beacon identifier to result in a decrypted output;
   generating, on the client computing device, a check hash digest by applying a cryptographic hash function to the received beacon identifier;
   verifying a validity of a digital certificate corresponding to the received beacon identifier, the digital certificate comprising the public key and the received beacon identifier;
   determining the check hash digest matches the decrypted output;
   determining the location of the client computing device using the received beacon identifier in response to the check hash digest matching the decrypted output and the digital certificate being verified as valid.

2. The method of claim 1, wherein the step of determining the location of the client computing device comprises retrieving location information previously associated with the received beacon identifier.

3. The method of claim 1, wherein the step of determining the location of the client computing device comprises retrieving location information previously associated with the received beacon identifier, and using the location information and a signal strength to determine the location of the client computing device.

4. The method of claim 3, wherein the step of determining the location of the client computing device is further defined in that the signal strength is determined by the client computing device measuring a strength of a signal delivering the one or more advertising packets.

5. The method of claim 1, wherein the step of verifying comprises the step of transmitting, from the client computing device, a certificate validation request to a remote certificate validation computer via a computer network, where the certificate validation request comprises the received beacon identifier, and the remote certificate validation computer attempts to verify the digital certificate.

6. The method of claim 1 wherein the step of receiving is further defined in that the one or more advertising packets transmitted from the electronic beacon are received without first establishing an authenticated connection from the client computing device to the electronic beacon.

7. The method of claim 1, wherein the step of generating, on the client computing device, the check hash digest comprises the step of generating the check hash digest using the cryptographic hash function where the cryptographic hash function is defined in the digital certificate.

8. The method of claim 1, wherein the step of verifying the digital certificate comprises the steps of receiving the digital certificate from a digital certificate authority.

9. The method of claim 1, wherein the step of verifying the digital certificate comprises the steps of
decrypting, on the client computing device, a certificate digital signature of the digital certificate using a public key of a digital certificate authority that issued the digital certificate to result in a decrypted digital certificate signature;
generating, on the client computing device, a check certificate hash digest by applying a hash algorithm to a content of the digital certificate, where the hash algorithm is associated with the digital certificate authority; and,
validating the certificate digital signature if the decrypted digital certificate signature matches the check certificate hash digest.

10. The method of claim 9, wherein the step of verifying the digital certificate further comprises the steps of
validating a certificate chain comprising a chain of certificates from the digital certificate authority to a root certificate authority;
verifying a one or more validity parameters of the digital certificate; and,
validating the digital certificate if the certificate digital signature is valid, and the certificate chain is valid, and the one or more validity parameters of the digital certificate are validated.

11. The method of claim 1,
wherein the step of receiving comprises the step of receiving a plurality of advertising packets, each of the plurality of advertising packets comprising one of a plurality of segments of the beacon identifier signature, wherein the beacon identifier signature was divided in the plurality of segments of the beacon identifier signature, and wherein the one or more advertising packets comprises the plurality of advertising packets; and,
wherein the method comprises the steps of
joining the plurality of segments of the beacon identifier signature; and,
identifying the beacon identifier signature from the plurality of segments of the beacon identifier signature after the step of joining.

12. The method of claim 1, wherein the step of receiving is further defined in that the received beacon identifier and the beacon identifier signature are received in different advertising packets of the one or more advertising packets, where the one or more advertising packets comprises a plurality of advertising packets.

13. The method of claim 1, wherein
the step of receiving comprises the step of receiving the one or more advertising packets comprising a signature payload, the signature payload comprises the beacon identifier signature and a signature number;

the step of decrypting comprises the step decrypting the signature payload using the public key associated to result in the decrypted output; and
the step of generating comprises the step of generating, on the client computing device, the check hash digest by applying the cryptographic hash function to a combination of the received beacon identifier and the signature number.

14. The method of claim 1, wherein the step of decrypting comprises retrieving, from a trusted beacon certificate authority, the digital certificate corresponding to the received beacon identifier, the digital certificate comprising the public key.

15. The method of claim 1, comprising the steps of:
generating an asymmetric pair of electronic keys, comprising the public key and a private key, for the electronic beacon;
submitting the public key and a issued beacon identifier to a trusted beacon certificate authority;
generating, at the trusted beacon certificate authority, the digital certificate comprising at least the public key, the issued beacon identifier, and a cryptographic certificate signature;
generating, on the electronic beacon, a hash digest of the issued beacon identifier and a first cryptographic nonce, with the cryptographic hash function;
encrypting, on the electronic beacon, the hash digest using the private key to create an issued beacon identifier signature;
broadcasting wirelessly, from the electronic beacon, the issued beacon identifier signature in the one or more advertising packets, and the issued beacon identifier in the one or more advertising packets; and,
at predetermined times, generating a new cryptographic nonce, on the electronic beacon, and repeating the steps of generating a hash digest using the new cryptographic nonce in place of the first cryptographic nonce, encrypting, and broadcasting.

16. The method of claim 15, wherein the step of broadcasting comprises the steps of segmenting the beacon identifier signature into a plurality of segments; and broadcasting each segment of the plurality of segments in an advertising packet of the one or more advertising packets, where the one or more advertising packets comprises a plurality of advertising packets.

17. The method of claim 15, wherein the generating an asymmetric pair of electronic keys comprises the step of generating, on the electronic beacon, the asymmetric pair of electronic keys.

18. A client electronic device, comprising a processor;
a memory;
a wireless receiver;
one or more communication channels signal-connecting the memory to the processor and signal-connecting the wireless receiver to the memory and the processor;
a listening function executable by the processor to detect, using the wireless receiver, a wireless transmission of an electronic beacon;
a receiving function executable by the processor to receive a one or more advertising packets transmitted from the electronic beacon, the one or more advertising packets comprising a beacon identifier signature and an received beacon identifier, the beacon identifier signature is a digital signature;
a decrypting function executable by the processor to decrypt the beacon identifier signature using a public key associated with the received beacon identifier to result in a decrypted output;

a generating function executable by the processor to generate a check hash digest by applying a cryptographic hash function to the received beacon identifier;

a verifying function executable by the processor to verify a validity of a digital certificate corresponding to the received beacon identifier, the digital certificate comprising the public key and the received beacon identifier;

a match determining function executable by the processor to determine whether the check hash digest matches the decrypted output;

a location determining function executable by the processor to determine a location of the client electronic device using the received beacon identifier in response to the check hash digest matching the decrypted output and the digital certificate being verified as valid.

19. The device of claim 18, wherein the location determining function comprises a retrieving function for retrieving location information previously associated with the received beacon identifier.

20. The device of claim 19, wherein the location determining function comprises a signal strength function for determining a signal strength of a signal of the one or more advertising packets transmitted from the electronic beacon, the location determining function uses the location information and the signal strength to determine the location of the client electronic device.

21. The device of claim 18, wherein the verifying function is configured to transmit, from the client electronic device, a certificate validation request to a remote certificate validation computer via a computer network, where the certificate validation request comprises the received beacon identifier, and the remote certificate validation computer attempts to verify the digital certificate.

22. The device of claim 18, wherein the receiving function is configured to receive the one or more advertising packets transmitted from the electronic beacon are without first establishing an authenticated connection from the client electronic device to the electronic beacon.

23. The device of claim 18, wherein the generating function is configured to generate the check hash digest using the cryptographic hash function where the cryptographic hash function is defined in the digital certificate.

* * * * *